United States Patent [19]
Zegarski

[11] Patent Number: 5,141,673
[45] Date of Patent: Aug. 25, 1992

[54] PROCESS OF PREPARING TANTALATE X-RAY INTENSIFYING PHOSPHORS WITH IMPROVED X-RAY TO LIGHT CONVERSION EFFICIENCY

[75] Inventor: William J. Zegarski, Towanda, Pa.

[73] Assignee: E. I. Du Pont de Nemours and Company, Wilmington, Del.

[21] Appl. No.: 627,993

[22] Filed: Dec. 17, 1990

[51] Int. Cl.$^5$ ............................................. C09K 11/78
[52] U.S. Cl. ............................ 252/301.4 R; 250/483.1
[58] Field of Search ............. 252/301.4 R; 250/483.1; 428/690

[56] References Cited

U.S. PATENT DOCUMENTS

| | | |
|---|---|---|
| 3,650,975 | 3/1972 | Yale ............................... 452/301.4 F |
| 4,225,653 | 9/1980 | Brixner .................................. 428/539 |
| 4,929,384 | 5/1990 | Reddy ........................... 252/301.4 R |
| 4,938,890 | 7/1990 | Reddy ........................... 252/301.4 R |
| 4,959,174 | 9/1990 | Nakajima et al. ............. 252/301.4 R |
| 4,970,024 | 11/1990 | Reddy, II ...................... 252/301.4 R |

Primary Examiner—Jack Cooper

[57] ABSTRACT

A process for preparing X-ray intensifying M' monoclinic tantalate phosphors by firing precursor oxides in a novel flux mixture of alkali metal sulfate/alkali metal or alkaline earth chloride/alkali metal metasilicate. Tantalate phosphors made in this manner have improved X-ray to light conversion efficiency. X-ray intensifying screens made from these phosphors have improved speed and can be used with good results with a plurality of X-ray film elements.

6 Claims, 1 Drawing Sheet

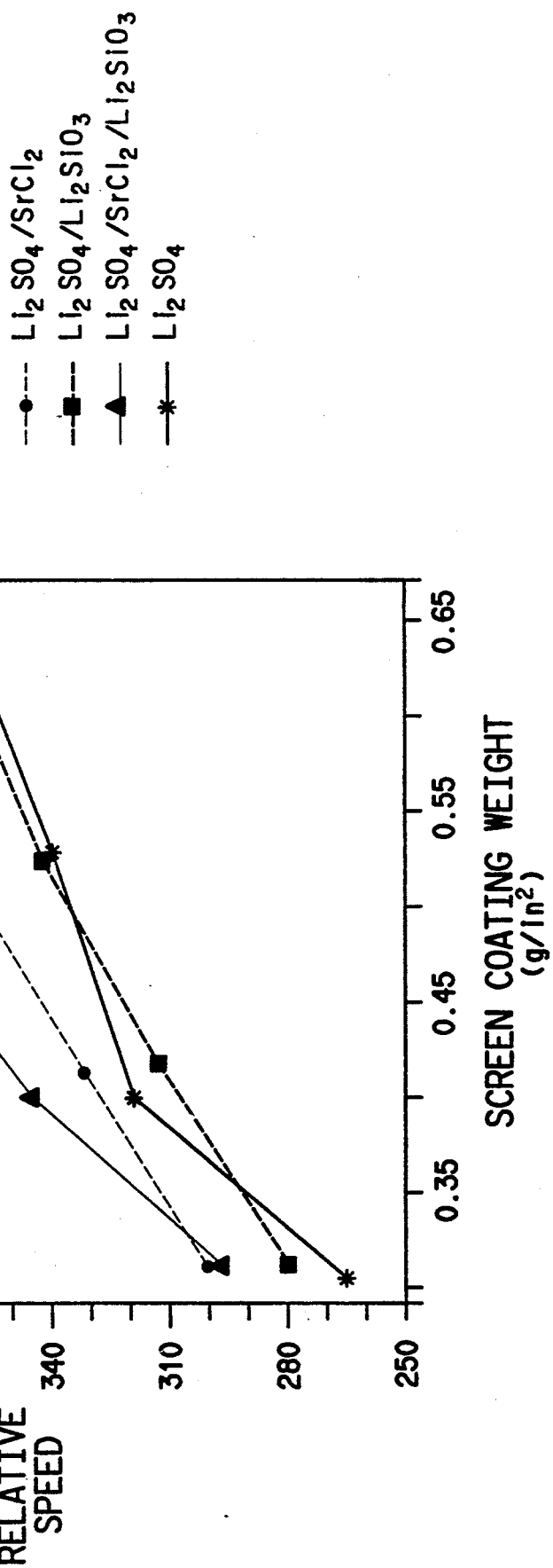

PROCESS OF PREPARING TANTALATE X-RAY INTENSIFYING PHOSPHORS WITH IMPROVED X-RAY TO LIGHT CONVERSION EFFICIENCY

FIELD OF THE INVENTION

This invention relates to a process for preparing X-ray intensifying phosphors. More particularly this invention relates to a process for preparing X-ray intensifying phosphors with improved X-ray to light conversion efficiency.

BACKGROUND OF THE INVENTION

X-ray intensifying screens are generally used in conjunction with silver halide photographic films and serve to enhance the image formed on that film. Phosphors, which are the active component of X-ray screens, are legion in number and include the tungstates, the oxysulfides, and the oxybromides, among others.

Particularly efficient phosphors which may be used in the preparation of an X-ray intensifying screen are the tantalates described by Brixner in U.S. Pat. No. 4,225,623. These phosphors are based on yttrium, lutetium, and gadolinium tantalates of the M' monoclinic form and are generally activated with rare earths such as terbium, thulium and niobium, for example, as well described in the aforementioned reference. Since these phosphors have a high X-ray stopping power, they are presently widely used for the preparation of these intensifying screens and the method for their preparation includes the mixing of ingredients followed by firing this mixture to form the phosphor crystal lattice itself.

In the process of preparing tantalate phosphors, it has been found that alkali halides and combinations of alkali halides and alkaline earth halides are suitable for use as fluxes in increasing the reaction rate between oxides of yttrium and tantalum. A problem associated with the use of halides is their low melting points and the reactivity of these compounds with materials of construction used in furnaces and crucibles which contain the reaction mixture. The reaction between yttrium oxide and oxides of tantalum and niobium is best run at temperatures above 1200° C. At these temperatures, lithium and sodium chlorides are within 250° C. of their boiling points. Consequently, significant amounts of the chlorides are present as highly reactive gases in the furnace and the crucibles holding the reaction mixture. This condition can lead to shortened equipment lifetimes. Alkali sulfates are more stable in this regard but give phosphor with lower efficiency due to the effect of flux decomposition products. Lithium and sodium sulfates decompose, at the high reaction temperature used to obtain the phosphor, to lithium and sodium oxide, respectively, and sulfur trioxide. To minimize the effect of the decomposition products, small amounts of a sequesterant such as alkali metal metasilicate, e.g., lithium metasilicate, etc., is added to react with the alkali oxide and produce lithium orthosilicate.

It has been found that tantalate phosphors with very high efficiency can be produced while minimizing effects of flux and decomposition products by combining the stable sulfates with the reactive halides in the presence of small amounts of a sequesterant compound.

SUMMARY OF THE INVENTION

In accordance with this invention there is provided a process for preparing a phosphor having the monoclinic M' structure selected from the group consisting of:
(a) $YNb_xTa_{1-x}O_4$, where x is 0 to about 0.15;
(b) $LuNb_xTa_{1-x}O_4$, where x is 0 to about 0.20;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);
(j) any of (a) to (i) wherein up to 45 mole percent of the yttrium, lutetium or gadolinium is replaced by lanthanum;
(k) any of (a) to (i) wherein up to 15 mole percent of the yttrium, lutetium or gadolinium is replaced by ytterbium; and
(l) any of (a), (b), (c), (d) and (e) wherein up to 15 mole percent of the yttrium or lutetium is replaced by gadolinium;

the process comprising
(a) intimately mixing stoichiometric quantities of corresponding precursor oxides with a ternary flux comprising alkali metal sulfate/alkali metal or alkaline earth chloride/alkali metal metasilicate;
(b) firing the flux-containing mixture in an inert container in the range of about 1100° C. to less than about 1400° C. for at least about 3 hours; and
(c) recovering the phosphor, whereby a more efficient phosphor system is achieved.

BRIEF DESCRIPTION OF THE DRAWING

The accompanying figure forms a material part of this disclosure wherein:
FIGURE is a plot of screen coating weight vs. relative speed of phosphors prepared using various fluxes or flux mixtures.

DETAILED DESCRIPTION OF THE INVENTION

The FIGURE shows plots of niobium activated yttrium tantalate phosphor prepared with various fluxes, i.e., lithium sulfate, described in Control 1 below; lithium sulfate with 0.5% by weight replaced by 0.5% by weight lithium metasilicate, described in Control 2 below; lithium sulfate with 5% by weight replaced by 5% by weight strontium chloride, described in Control 3 below; and lithium sulfate with 0.5% by weight replaced by 0.5% by weight lithium metasilicate and 4.5% by weight replaced by 4.5% by weight strontium chloride described in Example 1 below. These plots, wherein the curves represent phosphors prepared using various fluxes and one phosphor prepared by the process of this invention, are shown in Relative Speed vs. X-ray Screen Coating Weight ($gm/in^2$). All these plots show the improved efficiency that can be obtained using the process of this invention vs. phosphor prepared without the presence of at least one of lithium sulfate, strontium chloride and lithium metasilicate during firing.

The M' monoclinic tantalate phosphors of this invention are preferably prepared as described in Brixner U.S. Pat. No. 4,225,623, the disclosure of which is incorporated herein by reference. Thus, during the conventional manner for preparing a tantalate phosphor, stoichiometric amounts of the various precursor oxides are usually blended to form an intimate mixture. This blending may be accomplished in a number of conventional ways. For example, the ingredients may be ball-milled or simply shaken together in some sort of blender. The use of a liquid medium to improve the efficiency of the mixing process such as water, fluorochlorinated hydrocarbons or other such inert fluids, may also be incorporated. Then, to make the X-ray intensifying phosphor of this invention, this mixture of ingredients is also mixed with a suitable flux containing alkali metal sulfate and alkali metal or alkaline earth chloride in which an effective amount of an alkali metal metasilicate is also incorporated. While not being limited to any particular theory, the presence of the alkali metal metasilicate is believed to be a critical member of the flux combination of this invention as attested, for example, by the following reaction which occurs during decomposition of an alkali metal sulfate, e.g., Li$_2$SO$_4$, a common flux used in the preparation of tantalate phosphors.

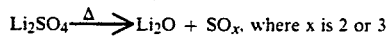

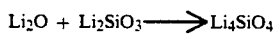

It is believed that the addition of alkali metal metasilicate to the flux sequesters alkali metal oxide which may be formed in the course of the firing reaction. The alkali metal or alkaline earth chloride component of the flux may act as a wetting agent allowing for a more complete reaction of the precursor oxides. The three component mixture is more stable than a combination of chloride fluxes, e.g., lithium and strontium chloride.

After firing in the conventional manner, flux and soluble reaction products are removed by water leaching. The luminescent product which has the selected particle size is a tantalate of the M' monoclinic variety is then recovered and is useful for the preparation of an X-ray intensifying screen.

The ternary flux combination consists essentially of an alkali metal, e.g., lithium, sodium, potassium, etc., sulfate; an alkali metal, e.g., lithium, sodium, potassium, etc., chloride or an alkaline earth, e.g., strontium, barium, magnesium, calcium, etc., chloride; and the alkali metal, e.g., lithium, sodium, potassium, etc., metasilicate. The total flux is present in the reaction mixture in about 35% to about 60% by weight, preferably about 45% to about 55% by weight, based on the total weight of precursor oxide (phosphor starting material). The alkali metal sulfate is present in about 33.5% to about 48.5% by weight, preferably about 43% to about 46% by weight,; the alkali metal or alkaline earth chloride is present in 1% to about 15% by weight, preferably about 3% to about 6% by weight; and the alkali metal metasilicate is present in an amount of about 0.1% to about 1.5% by weight, preferably about 0.4% to about 0.6% by weight, based on the total weight of phosphor starting material. A particularly preferred flux combination is Li$_2$SO$_4$/SrCl$_2$/Li$_2$SiO$_3$ present in an amount of 45%/4.5%/0.5%, respectively, wherein all percentages are by weight and are based on the total weight of phosphor starting material.

The mixture of phosphor starting materials, flux combination with alkali metal metasilicate can be fired, e.g., for at least about three hours, at elevated temperatures, e.g., from 1100° C. to 1400° C., before washing to remove the flux and recovering the phosphor. A preferred temperature range is from 1250° C. to 1300° C.

After the intensifying phosphor is made according to the teachings of this invention, it may be dispersed in any of the commonly known binders, e.g., polyvinyl butyral or the acrylates or methacrylates, using a solvent, e.g., an alcohol, e.g., n-propanol, etc.; chlorinated hydrocarbon, ketone, ester, e.g., n-butyl acetate, etc. Small amounts of fumed silica may be present in the phosphor to enhance handling and make the phosphor easier to pour. After dispersing in the binder, the phosphor is then cast on a conventional support, e.g., cardboard, polyester film, thin metal sheets, etc. A brightener may also be present within the phosphor and various reflective materials may be present as an underlayer or within the support itself to enhance the generation of light when the phosphor is struck by X-radiation. TiO$_2$ dispersed in a binder and cast on the support is conventional as well as the use of small particles of rutile TiO$_2$ directly in a film support. All of these procedures are well-known in the art. Over the phosphor layer which has been cast on the support, a conventional protective topcoat may be applied. These topcoats are also well-known in the prior art and serve to protect the rather expensive phosphor layer from stains and defects during the handling thereof. Conventional supports, binders, mixing and coating processes for the manufacture of typical X-ray intensifying screens are, for example, described in Patten U.S. Pat. No. 4,387,141, the pertinent disclosures of which are incorporated herein by reference.

It is conventional to use the intensifying phosphors of this invention as X-ray intensifying screens. These are usually used in pairs in cooperation with double-side coated medical X-ray silver halide photographic film elements, although it is sometimes common to use single-side coated silver halide photographic film elements for some applications. A pair of screens is conventionally used and the coating weights of each screen may be different, if required. Thus, an asymmetric pair of screens can be used to get the best results. Medical X-ray evaluations represent the commercial use for the phosphor of this invention cast into an X-ray intensifying screen. A dimensionally stable, polyethylene terephthalate film support into which small amounts of rutile or anatase titanium dioxide have been incorporated is the preferred support for the phosphor of this invention.

EXAMPLES

This invention will now be illustrated by the following specific examples wherein the percentages and parts are by weight.

CONTROL 1

Yttrium oxide, niobium oxide and tantalum oxide in the molar ratios 1 to 0.005 to 0.995, respectively, were milled together to deagglomerate and mix the constituents. This mixture was then combined with lithium sulfate present in an amount of 50% based on the total weight of oxide and fired for 12 hours at 1290° C. Following removal of the lithium sulfate flux by washing with water, the phosphor is then dispersed by ball-milling 100 gm of the phosphor in 6 gm of a carboxylated methyl methacrylate acrylic binder with 1 gm of a mixture of a block copolymer of polyoxyethylene and polypropylene glycol, a plasticizer, and dioctyl sodium sulfosuccinate, wetting agent, using a solvent mixture of a 1 to 1 weight mixture of n-butyl acetate and n-propanol. This suspension was coated on 0.010 inch (0.25 mm) polyethylene terephthalate with about 5 mg/cm$^2$ TiO$_2$ dispersed therein. At a coating weight of 0.65 g/sq. in., the speed of the phosphor was found to be 2.70 times that of a commercial HiPlus X-ray intensifying screen, E. I. du Pont de Nemours and Company, Wilmington, Del.

To make comparison of other examples and controls to this control more apparent, the speed of Control 1 will be considered to be 1.00 at a coating weight of 0.65 g/sq.in. The speeds of the following phosphors will be compared to this control.

CONTROL 2

Phosphor was prepared as described in Control 1 but 0.5% of the lithium sulfate was replaced by 0.5% lithium metasilicate. The resultant phosphor gave a speed of 1.02, an improvement over that of the phosphor of Control 1. The increased phosphor efficiency demonstrates the improvement resulting from the addition of a small amount of sequesterant to minimize the influence of lithium sulfate decomposition products on the phosphor.

CONTROL 3

Phosphor was prepared as described in Control 1 but 5% of the flux was replaced by 5% strontium chloride. The resulting phosphor gave a speed of 1.08, an improvement over that of the phosphor of Control 1. The higher phosphor speed demonstrates the fact that halides improve the reaction between yttrium oxide and tantalum and niobium oxides.

EXAMPLE 1

Phosphor was prepared as described in Control 1 but with the substitution of 0.5% of the lithium sulfate by lithium metasilicate and substitution of an additional 4.5% of lithium sulfate by strontium chloride. The resulting phosphor had a speed of 1.16, a substantial improvement over that of the phosphor of Control 1. This speed is surprising since if the effect of lithium metasilicate and strontium chloride are simply additive, a speed of 1.10 should be obtained. The further improvement in speed suggests an unexpected synergistic influence from combining the alkali metal metasilicate with the chloride.

EXAMPLE 2

A 13 kg batch of yttrium oxide, niobium oxide and tantalum oxide in the molar ratios described in Control 1 were combined in a vibro-rotary media mill. The resulting oxide blend was divided into 5 parts. Each part was blended with 45% lithium sulfate, 0.5% lithium metasilicate and 4.5% of an alkali or alkaline earth chloride based on the total weight of oxides present. The reaction mixes were subjected to firing at 1290° C. for 12 hours. After removal of the soluble salts by washing with water, the phosphors were made into X-ray intensifying screens as described in Control 1 in order to test their efficiency. The following results were obtained:

| Added Chloride | Speed | Coating Weight |
|---|---|---|
| Lithium | 3.10 | .648 |
| Sodium | 3.17 | .638 |
| Potassium | 3.11 | .655 |
| Barium | 3.14 | .642 |
| Strontium | 3.25 | .673 |
| None as Control 1 | 2.70 | .650 |

As these data demonstrate, the effect of adding alkali or alkaline earth chlorides to the reaction mixture results in higher than expected phosphor efficiency.

The higher phosphor efficiency means that the speed of the medical X-ray imaging system in which these phosphors are used will result in lower exposure of patients to X-radiation thereby increasing the safety of the imaging process.

I claim:

1. A process for preparing a phosphor having the monoclinic M' structure selected from the group consisting of:
   (a) YNb$_x$Ta$_{1-x}$O$_4$, where x is 0 to about 0.15;
   (b) LuNb$_x$Ta$_{1-x}$O$_4$, where x is 0 to about 0.20;
   (c) Y$_{1-y}$Tm$_y$TaO$_4$, where y is 0 to about 0.03;
   (d) a solid solution of (a) and (b);
   (e) a solid solution of (a) and (c);
   (f) Y$_{1-y}$Tb$_y$TaO$_4$, where y is about 0.001 to about 0.15;
   (g) Lu$_{1-y}$Tb$_y$TaO$_4$, where y is about 0.001 to about 0.15;
   (h) Gd$_{1-y}$Tb$_y$TaO$_4$, where y is about 0.001 to about 0.15;
   (i) a solid solution of at least two of (f), (g) and (h);
   (j) any of (a) to (i) wherein up to 45 mole percent of the yttrium, lutetium or gadolinium is replaced by lanthanum;
   (k) any of (a) to (i) wherein up to 15 mole percent of the yttrium, lutetium or gadolinium is replaced by ytterbium; and
   (l) any of (a), (b), (c), (d) and (e) wherein up to 15 mole percent of the yttrium or lutetium is replaced by gadolinium;
   the process comprising
   (a) intimately mixing stoichiometric quantities of corresponding precursor oxides with a ternary flux consisting essentially of (i) 33.5 to 48.5% by weight of an alkali metal sulfate; (ii) 1 to 15% by weight of an alkali metal chloride or an alkaline earth chloride; and (iii) 0.1 to 1.5% by weight of an alkali metal metasilicate;
   (b) firing the flux-containing mixture in an inert container in the range of about 1100° C. to less than about 1400° C. for at least about 3 hours; and
   (c) recovering the phosphor, wherein the ternary flux is present in about 35% by weight to 60% by weight based on the total weight of precursor oxides.

2. A process according to claim 1 wherein the ternary flux mixture consists essentially of lithium sulfate/strontium chloride/lithium metasilicate.

3. A process according to claim 2 wherein lithium sulfate/strontium chloride/lithium metasilicate are present in 45%/4.5%/0.5% by weight, respectively.

4. A process according to claim 1 wherein the phosphor is terbium activated yttrium tantalate.

5. A process according to claim 1 wherein the phosphor is thulium activated yttrium tantalate.

6. A process according to claim 1 wherein the phosphor is niobium activated yttrium tantalate.

* * * * *